(12) United States Patent
Nguyen et al.

(10) Patent No.: US 10,970,268 B2
(45) Date of Patent: Apr. 6, 2021

(54) SYSTEM OF MIGRATION AND VALIDATION

(71) Applicant: salesforce.com, inc., San Francisco, CA (US)

(72) Inventors: Minh Nguyen, Union City, CA (US);
Kevin Wang, San Mateo, CA (US);
Devra Struzenberg, Walnut Creek, CA (US); Zhongyu Ma, Millbrae, CA (US);
Xin Li, San Francisco, CA (US);
Ronald Liu, Seattle, WA (US); Carla Ferreira, Redmond, WA (US); Amber Murray, San Francisco, CA (US); Le Gao, Kirkland, WA (US)

(73) Assignee: salesforce.com, inc., San Francisco, CA (US)

( * ) Notice: Subject to any disclaimer, the term of this patent is extended or adjusted under 35 U.S.C. 154(b) by 657 days.

(21) Appl. No.: 15/803,555

(22) Filed: Nov. 3, 2017

(65) Prior Publication Data

US 2019/0138626 A1 May 9, 2019

(51) Int. Cl.
*G06F 16/20* (2019.01)
*G06F 16/23* (2019.01)
*G06F 16/21* (2019.01)

(52) U.S. Cl.
CPC ........ *G06F 16/2365* (2019.01); *G06F 16/219* (2019.01)

(58) Field of Classification Search
CPC ..... G06F 16/214; G06F 16/27; G06F 16/2365
See application file for complete search history.

(56) References Cited

U.S. PATENT DOCUMENTS

| | | | | |
|---|---|---|---|---|
| 9,607,066 B1* | 3/2017 | Mechael | ................. | G16H 40/63 |
| 2011/0321025 A1* | 12/2011 | Challa | ................. | G06F 9/44505 717/169 |
| 2012/0089711 A1* | 4/2012 | Zager | ................... | G06F 9/4856 709/221 |
| 2012/0109885 A1* | 5/2012 | Grube | ................. | G06F 11/0727 707/609 |
| 2013/0339943 A1* | 12/2013 | Mallya | ...................... | G06F 8/60 717/176 |
| 2015/0019488 A1* | 1/2015 | Higginson | ............ | G06F 16/214 707/634 |
| 2016/0140194 A1* | 5/2016 | Chang | ................... | G06F 16/214 709/203 |
| 2017/0061027 A1* | 3/2017 | Chesla | ................... | G06F 16/955 |
| 2017/0192777 A1* | 7/2017 | Apte | ...................... | G06F 8/427 |

* cited by examiner

*Primary Examiner* — Mohammad S Rostami
(74) *Attorney, Agent, or Firm* — Sterne, Kessler, Goldstein & Fox P.L.L.C.

(57) ABSTRACT

Disclosed herein are system, method, and computer program product embodiments system of migration and validation. An embodiment operates by receiving an indication of a plurality of documents for migration from a legacy data format to a new data format of a computing system. A first set of data statistics corresponding to a selected one of the subset of documents prior to a performance of the migration, and a second set of data statistics corresponding to the selected document after the performance of the migration are determined. Both the first set of data statistics and the second set of data statistics side-by-side for the selected document are displayed. An indication whether the migration is validated or invalidated is received.

20 Claims, 3 Drawing Sheets

SYSTEM OF MIGRATION AND VALIDATION

BACKGROUND

As business and technical systems are upgraded and changed, often times existing business documents need to be reformatted or migrated from a current or legacy document format to a new document format. One of the challenges in performing migrations is ensuring that no data from the existing documents is lost during the migration process from the legacy format to the new format. To ensure no data is permanently lost, the migration process should be validated prior to removing the old or existing business data in the legacy format.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for a system of migration and validation.

Figure 1:
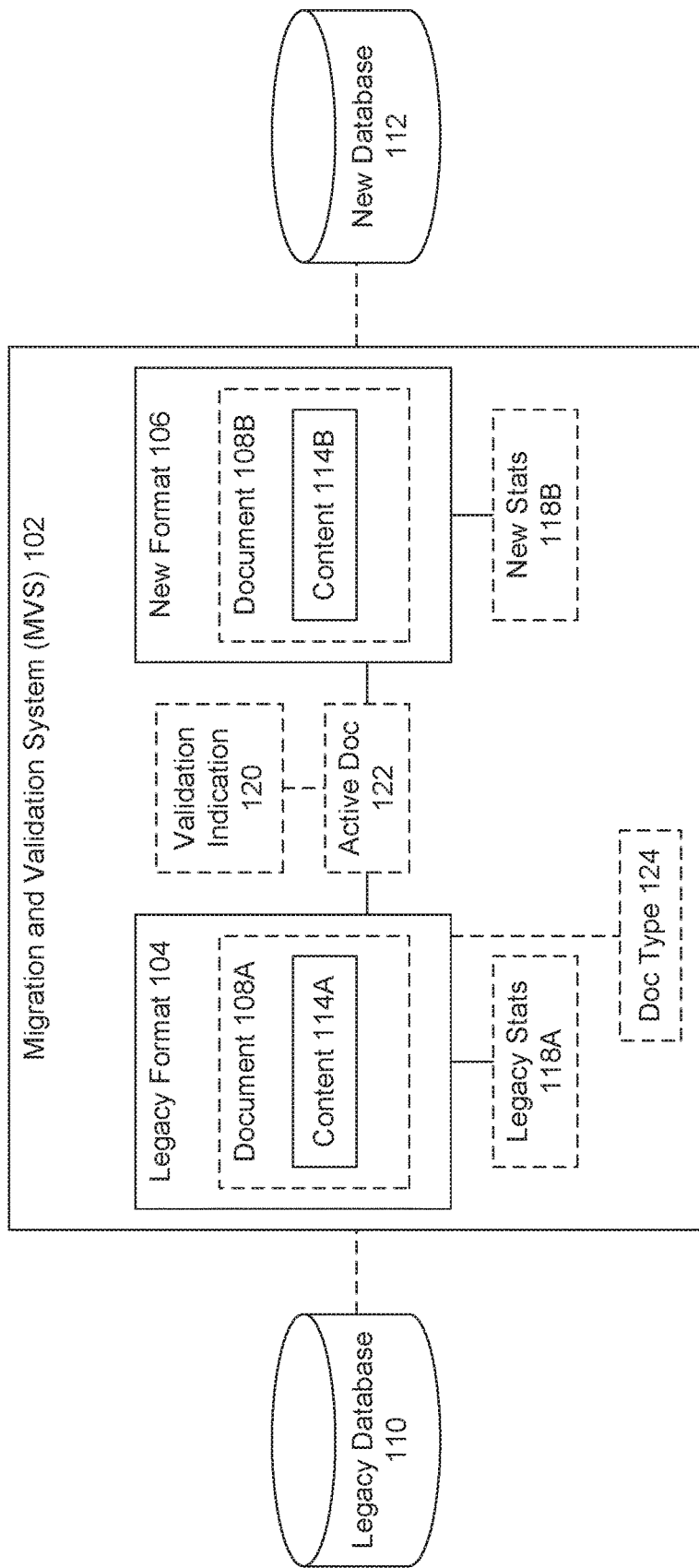
FIG. 1 is a block diagram showing example operations related to a system of migration and validation, according to some embodiments.

FIG. 1 is a block diagram 100 showing example operations related to a system of migration and validation, according to some embodiments. Migration and validation system (MVS) 102 may coordinate the migration and validation of documents from a legacy format 104 to a new format 106.

As business and technical systems are upgraded and changed, often times existing business documents 108 need to be reformatted, converted, or migrated from a current or legacy format 104 to a new format 106. The data format could be changed for any number of reasons, including but not limited to, adapting to new versions of software, improving readability or usability by an end user, or reducing storage requirements for information, etc. One of the challenges in performing migrations is ensuring that no data from the existing documents 110 is lost during the migration process from the legacy format 104 to the new format 106. To ensure no data is permanently lost, MVS 102 enables users to validate that a document in the new format 108B matches or corresponds to the document in the legacy format 108A or that there are no other unexpected changes.

MVS 102 may allow real-time migration of live or active documents (documents that are being accessed or are otherwise accessible to users of a computing system). For example, MVS 102 may enable visitors of a website to continue accessing documents 110 as they are converted or migrated from legacy format 104 to new format 106. MVS 102 may manage access to both legacy documents 108A and newly formatted documents 108B, by maintaining accessibility to only one version of the document (via an active doc flag 122) at any given time. MVS 102 may ensure that system users do not see two different versions of the same document 108 in the live system that is being accessed or that may remain accessible throughout the migration and validation processes.

After receiving a validation indication 120 that the migration from document 108A to document 108B has been validated (e.g., there are no errors in document 108B), MVS 102 may activate the new version of the document 108B by setting the active doc flag 122 and document 108A may correspondingly be deactivated. If, however, the migration to document 108B is invalidated by validation indication 120, the migration may be cancelled, postponed, or rolled back, and users may continue to access the active document 108A without any interruption of service or accessibility.

In an embodiment, a migration system (not shown) may be responsible for converting document 108 from legacy format 104 to new format 106. The migration system may retrieve legacy documents from a legacy database 110, convert the documents into new format 106, and store them in a new database 112. In an embodiment, legacy database 110 and new database 112 may be part of the same database, memory, storage, or computing device, may be communicably coupled, or may exist separately from one another. MVS 102 may coordinate with the migration system, collecting statistics 118 about the documents 108 being converted both prior to and after the conversion or migration between data formats 104, 106. MVS 102 may present the collected statistics 118 in a side-by-side (or top-bottom) display for validation by one or more users or administrators.

Statistics 118 may include any enumerated or quantifiable information that can be collected, aggregated, and/or otherwise processed about a document 108 both before and after migration or conversion from legacy format 104 to new format 106. Example statistics 118 include a word count, page count, link count, comment count, and image count. One skilled in the relevant arts would appreciate that other information about document 108 may be included in statistics 118. Other example information includes how many revisions or translations a document 108 has undergone, or how many business objects (such as actual or use cases) to which the document 108 is linked, attached, or otherwise related.

By way of non-limiting example, the word count may include a count of how many words appear in document 108 (or a particular portion thereof). The page count may include how many pages or screens the document spans or is otherwise displayed across. The link count may include how many hyperlinks are included with content 114 of the document or are otherwise associated with document 108. The comment count may include how many user comments or other updates are displayed or associated with document 108. The image count may include how many images appear within content 114 of document 108.

Legacy statistics 118A may include the statistics collected prior to migration about the document 108, or from a first version of the document 108A in the legacy format 104. New statistics 118 may include the same statistics collected after the migration of document 108 into new format 106. For example, a word count may be performed both before and after the migration of document 108 to new format 106.

In an embodiment, MVS 102 may display legacy statistics 118A and new statistics 118B side-by-side (or top-down) enabling a comparison of these details both before and after migration. In an embodiment, MVS 102 may provide a visual indicator for any new statistics 118B which do not match corresponding legacy statistics 118A. In an embodiment, a variance in the statistics 118A, 118B may indicate that there is a potential issue or change that occurred during the migration of document 108. Providing statistics side-by-side may enable an easy comparison for a user who is validating the migration of document 108.

In an embodiment, MVS 102 may flag if the word count changes between document 108A and document 108B. A validating user, may then determine whether or not the change in word count was expected (as part of the new format 106 change) or unexpected (indicating there may be an issue with the migration that needs to be resolved). For example, changing the font size should not change the word count. As such, a variance in word counts may indicate that something the migration needs to be addressed or corrected. However, if all new documents (in new format 106) are limited to 500 words, then variance in word count from 863 words for document 108A to 500 words for document 108B may indicate that the migration has performed successfully.

In addition to displaying statistics 118 for comparison as part of the validation process, MVS 102 may also display the actual content 114 of document 108 both before 114A and after migration 114B. Content 114 may include any text, images, videos, or links within a document or webpage. MVS 102 may enable a validating user to see documents 108A and 108B as they would appear to an end user accessing the computing system or website.

In an embodiment, new format 106 may change the font type, font size, or other appearance or arrangement of content of a document from legacy format 104. MVS 102 may provide live or simulated-live versions of the document, so that a user validating the migrated document 108B can see how an end user would see or access document 108 both before and after migration, across one or more different device types or operating systems. For example, MVS 102 may provide a display on how content 114 would appear on a laptop, tablet, and mobile phone. In an embodiment, content 114 may include comments, updates, social media tags/references, or other feed items that were appended to or otherwise associated with a document 108 after it was initially published or otherwise made live or accessible to end users.

MVS 102 may enable an administrator or other user(s) to easily compare the side-by-side display of information to determine whether or not the migration of document 108 was successful. In an embodiment, MVS 102 may perform an automated comparison and highlight any differences between legacy format 104 and new format 106. For example, MVS 102 may provide an indication that font type has changed, but font size has stayed the same. Or, for example, MVS 102 may provide an indication that the words count before and after the migration has changed or does not match. MVS 102 may provide a visual indicator that indicates if any content 114 was deleted, moved, or added in the conversion to new format 106. If the validating user notices any differences that are unacceptable, the user may invalidate the migration. If however, everything appears as it was supposed to be in document 108B, the migration may be validated.

If the migration is invalidated, the migration system or migration administrator may be notified of the invalidation. In an embodiment, MVS 102 may enable a validating user to submit comments or an indication as to why document 108B was invalidated. In an embodiment, document 108B may need to be validated or invalidated by multiple users prior to a final validation or invalidation determination may be made. For example, three different users may each provide a separate or independent validation indication 120 on document 108 before MVS 102 marks the migration of document as being validated or invalidated.

MVS 102 may receive a validation indication 120 from each of the validating users, and if two out of the three users validates or approves the migration. MVS 102 may validate the migration for document 108. Or, for example, MVS 102 may require validation from all the reviewing users to validate the migration of document 108, and if any user invalidates the migration, then the migration may be invalidated.

Similarly, multiple different documents 108 may need to be validated prior to MVS 102 determining whether or not the entire migration was validated. For example, a sampling or subset of ten documents, from a database 110 of one thousand documents, may be selected by a validating user or at random may be provided for validation by a user prior to determining whether or not the migration is successfully validated or invalidated.

In an embodiment, validation may be performed on the selected subset of documents 108 from legacy database 110 prior to performing a migration on the remaining documents. For example, legacy database 110 may include 1000 documents, but a subset of 20 documents may be selected for migration and validation prior to performing a migration of the remaining documents. This may enable MVS 102 to save processing cycles that may otherwise be required to migrate all of the documents of legacy database 110 prior to validation if the migration is invalidated. The selected subset of documents may all be migrated together (prior to validation of any particular document), or may be migrated one-by-one, only upon validation of a previously validated migrated document.

In an embodiment, documents of legacy database 110 may be associated with varying document types 124. Document type 124 may indicate a function and/or format of the document 108. Example document types 124 includes sales orders, employee reimbursement forms, spreadsheets, web pages, word processing documents, HTML (hyper-text markup language) documents, and XML (extensible markup language) documents.

Using doc type 124, a migration may be validated or invalidated on a document-type by document-type basis. Then for example, even though there may be millions of legacy documents 110 for migration, the documents may be further separated or grouped by doc type 124. Then, migration of for each doc type 124 may be individually validated or invalidated.

Performing migration and validation based on doc type 124 may save computing cycles and processing resources in debugging, recompiling, executing the migration of documents 108. For example, rather than migrating all of the documents 110 at once, each document type 124 may individually be validated and migrated. Then, for example, if a particular migration for a particular type 124 is invalidated, that error could be fixed across the various migrations for the other document types 124 before those migrations are performed or validated. Otherwise if an error is found after a migration of all the documents, then all the documents for which processing cycles were used to generate, may then need to be deleted, only to be re-generated under a new migration and validation process after the error has been corrected. This could waste a lot of unnecessary computing cycles in the generation and deletion or garbage collection of migrated documents which have not been validated.

In an embodiment, if the migration of document(s) 108 is invalidated, then the migration process may be updated (to correct whatever errors may have been detected), and MVS 102 may perform a re-validation process. In an embodiment, re-validation may include the same documents being selected for re-validation. Or, for example, in another embodiment, a larger or different selection of documents may be selected or required for re-validation.

In an embodiment, MVS 102 may enable an administrator or user to re-migrate one or more documents 108. For example, if a discrepancy in document 108B is noticed during the validation process, a user may request a re-migration. Then, for example, MVS 102 may provide the user with the legacy document 104A and the re-migrated document 108B. In an embodiment, MVS 102 may provide access to the intermediately migrated document 108B as well. Then, for example, the user may compare the intermediately and most recently migrated documents 108 to determine if any differences exist between the documents.

When the migration has been validated, the remaining documents from legacy database 110 (which were not already converted) may be migrated to new database 112 (in new format 106) and/or otherwise made active 122. In an embodiment, once migration of all documents is complete (and the selected subset have been validated), the legacy documents 110 may be deleted or otherwise marked for deletion.

As noted above, legacy database 110 may include documents that are currently active or accessible to users of a computing system. The users may include clients, customers, employees, visitors of a website, or other users. For example, the documents 110 may include knowledge base documents that enable users to find answers to commonly asked questions by typing in searches or queries on a website. These documents may be considered 'live' or currently accessible to users who may be searching for and/or accessing one or more of the documents.

One feature of a successful migration of documents between formats is to ensure that valuable information is not lost during the migration process. MVS 102 enables a user to validate that the migration process has performed correctly, without the loss of any valuable information, by collecting and providing a side-by-side display of the document 108 and key statistics or features 118 both before and after the migration. Then, only after, a document 108 has been validated are the migrations performed for the remaining documents 110 and are the migrated documents 112 made active and the legacy formatted documents may be marked inactive or no longer be made accessible (to avoid providing user access to a document 108 in two different formats).

Figure 2:
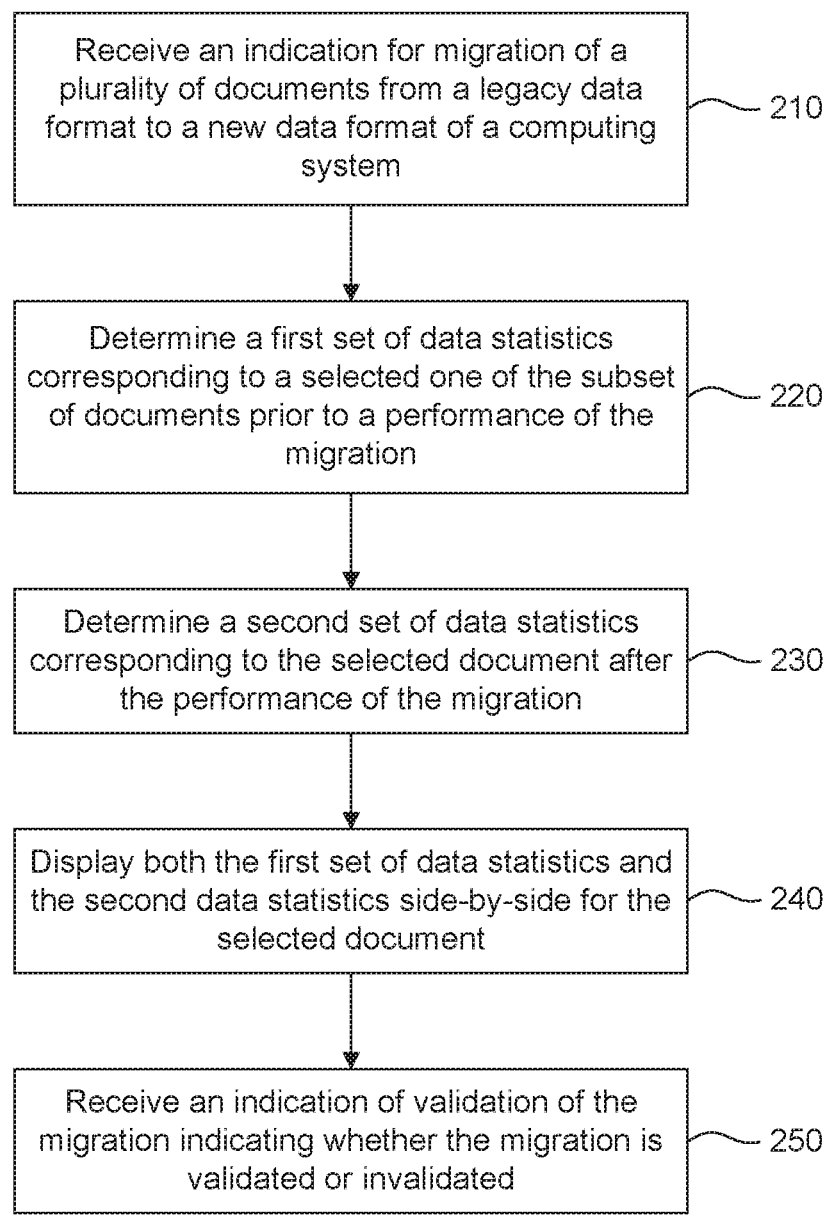
FIG. 2 is a flowchart illustrating a process for providing a system of migration and validation, according to some embodiments.

FIG. 2 is a flowchart illustrating a process 200 for providing migration and validation, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

At 210, an indication for migration of a plurality of documents from a legacy data format to a new data format of a computing system is received. For example, MVS 102 may receive an indication that legacy documents 110 may be converted from legacy format 104 to new format 106. The documents of legacy database 110 may include live or active documents that are currently being accessed or accessible to end users of a computing system or website. In an embodiment, the migration and validation may be performed via MVS 102 while maintaining the active status of at least one version of the documents throughout the process.

At 220, a first set of data statistics corresponding to a selected one of the subset of documents prior to a performance of the migration is determined. For example, MVS 102 may scan or analyze document 108A or metadata associated with document 108A to determine legacy statistics 118A about the active document 108A prior to migration.

At 230, a second set of data statistics corresponding to the selected document after the performance of the migration is determined. For example, MVS 102 may scan or analyze document 108B or metadata associated with document 108B to determine new statistics 118B about the inactive document 108B prior to migration.

At 240, both the first set of data statistics and the second data statistics are displayed side-by-side for the selected document. For example, MVS 102 may display legacy statistics 118A and new statistics 118B side-by-side for a user comparison and validation of the migration process. During the validation process, MVS 102 may maintain the active status 122 or accessibility of document 108A until document 108B is validated and made active or accessible 122.

At 250, an indication of validation of the migration indicating whether the migration is validated or invalidated is received. For example, MVS 102 may receive validation indication 120 indicating whether or not the migration or conversion of document 108 from legacy format 104 to new format 106 is validated. Based on a validation of the migration, document 108B may be made active 122 and documents 108A may be made inactive. Based on an invalidation of the migration, document 108A may remain active to the users accessing legacy database 110.

Figure 3:
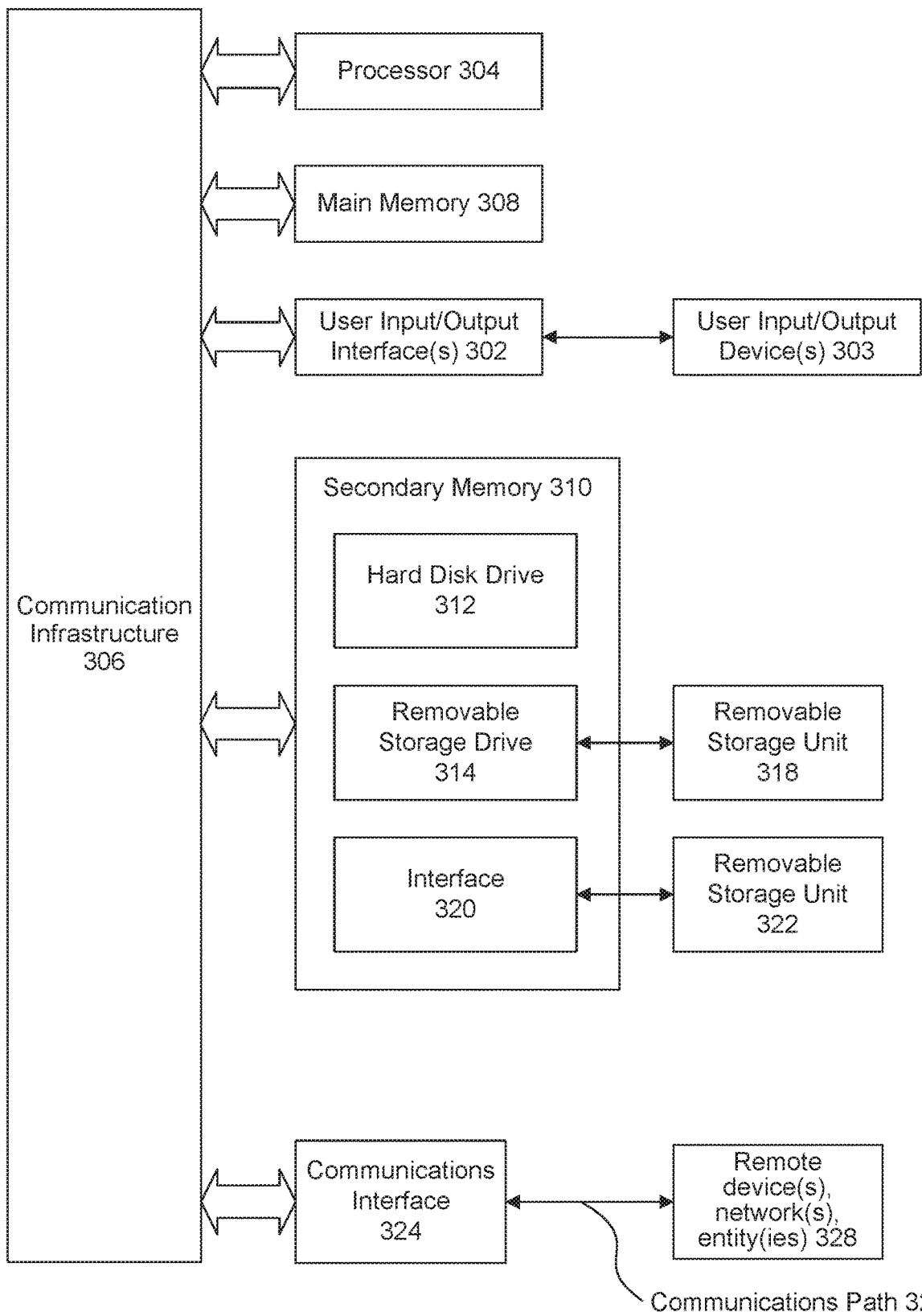
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
receiving an indication of a plurality of documents for migration from a legacy data format to a new data format of a computing system, wherein one or more of the plurality of documents are accessible to one or more users in the legacy data format;
determining a first set of data statistics corresponding to a selected one of the subset of documents prior to a performance of the migration;
determining a second set of data statistics corresponding to the selected document after the performance of the migration;
displaying both the first set of data statistics and the second set of data statistics side-by-side for the selected document, wherein the first set of data statistics comprises a first word count for the selected document prior to the performance of the migration and wherein the second set of data statistics comprises a second word count for the selected document after the performance of the migration, wherein a first version of the selected document in the legacy format remains accessible to the one or more users, wherein a second version of the selected document in the new data format is not accessible to the one or more users, and wherein both the first and second versions of the selected document are accessible for validation; and
receiving, responsive to the displaying, an indication whether the migration is validated or invalidated, wherein upon indication that the migration has been validated, the second version of the document is made accessible to the one or more users and the first version of the document is made inaccessible.

2. The method of claim 1, further comprising:
marking the first version of the document for deletion after the first version of the document is made inaccessible.

3. The method of claim 1, wherein the receiving the indication further comprises:
marking the second version of the document for deletion based upon the indication that the migration is invalidated, wherein the first version of the document remains made accessible.

4. The method of claim 1, wherein the both the first set of data statistics and the second set of data statistics include one or more of a version count, image count, or feed item count.

5. The method of claim 1, further comprising:
determining a document type of the selected document; and
determining one or more other documents of the plurality of documents with the same document type, wherein upon the indication that the migration is validated, a second version of the determined one or more other documents with the same document type is migrated from the legacy data format to the new data format and made accessible to the one or more users.

6. The method of claim 5, wherein the plurality of documents includes one other document type different from the document type of the selected document that is not validated by the indication.

7. The method of claim 6, wherein the determining the first set of data statistics, determining the second set of data statistics, the displaying, and the receiving the indication of validation is performed for a selected document of the other document type.

8. The method of claim 1, wherein the displaying comprises:
displaying content from the first version of the selected document side-by-side content from the second version of the selected document.

9. The method of claim 1, wherein the displaying comprises:
determining a variance between the first set of data statistics and the second set of data statistics; and
displaying a visual indicator of the variance.

10. The method of claim 1, further comprising:
identifying, prior to the displaying, that an active doc flag is set to the selected a first version of the selected document prior to the performance of the migration, wherein upon receiving the indication that the migration is validated, the active doc flag is set to a second version of the document after the performance of the migration.

11. A system, comprising:
a memory; and
at least one processor coupled to the memory and configured to:
receive an indication of a plurality of documents for migration from a legacy data format to a new data format of a computing system, wherein one or more of the plurality of documents are accessible to one or more users in the legacy data format;
determine a first set of data statistics corresponding to a selected one of the subset of documents prior to a performance of the migration;
determine a second set of data statistics corresponding to the selected document after the performance of the migration;
display both the first set of data statistics and the second set of data statistics side-by-side for the selected document, wherein the first set of data statistics comprises a first word count for the selected document prior to the performance of the migration and wherein the second set of data statistics comprises a second word count for the selected document after the performance of the migration, wherein a first version of the selected document in the legacy format remains accessible to the one or more users, wherein a second version of the selected document in the new data format is not accessible to the one or more users, and wherein both the first and second versions of the selected document are accessible for validation; and
receive, responsive to the displaying, an indication whether the migration is validated or invalidated, wherein upon indication that the migration has been validated, the second version of the document is made accessible to the one or more users and the first version of the document is made inaccessible.

12. The system of claim 11, wherein the processor is further configured to:
marking the first version of the document for deletion after the first version of the document is made inaccessible.

13. The system of claim 11, wherein the processor is further configured to:
    marking the second version of the document for deletion based upon the indication that the migration is invalidated, wherein the first version of the document remains made accessible.

14. The system of claim 11, wherein the both the first set of data statistics and the second set of data statistics include one or more of a version count, image count, or feed item count.

15. The system of claim 11, wherein the processor is further configured to:
    determine a document type of the selected document; and
    determine one or more other documents of the plurality of documents with the same document type, wherein upon the indication that the migration is validated, a second version of the determined one or more other documents with the same document type is migrated from the legacy data format to the new data format and made accessible to the one or more users.

16. The system of claim 15, wherein the plurality of documents includes one other document type different from the document type of the selected document that is not validated by the indication.

17. The system of claim 11, wherein the process configured to display is further configured to:
    display content from the first version of the selected document side-by-side content from the second version of the selected document.

18. The system of claim 11, wherein the process configured to display is further configured to:
    determine a variance between the first set of data statistics and the second set of data statistics; and
    display a visual indicator of the variance.

19. A non-transitory computer-readable device having instructions stored on a memory thereon that when executed by at least one processor of the device, causes the at least one processor to perform operations comprising:
    receiving an indication of a plurality of documents for migration from a legacy data format to a new data format of a computing system, wherein one or more of the plurality of documents are accessible to one or more users in the legacy data format;
    determining a first set of data statistics corresponding to a selected one of the subset of documents prior to a performance of the migration;
    determining a second set of data statistics corresponding to the selected document after the performance of the migration;
    displaying both the first set of data statistics and the second set of data statistics side-by-side for the selected document, wherein the first set of data statistics comprises a first word count for the selected document prior to the performance of the migration and wherein the second set of data statistics comprises a second word count for the selected document after the performance of the migration, wherein a first version of the selected document in the legacy format remains accessible to the one or more users, wherein a second version of the selected document in the new data format is not accessible to the one or more users, and wherein both the first and second versions of the selected document are accessible for validation; and
    receiving, responsive to the displaying, an indication whether the migration is validated or invalidated, wherein upon indication that the migration has been validated, the second version of the document is made accessible to the one or more users and the first version of the document is made inaccessible.

20. The device of claim 19, wherein the both the first set of data statistics and the second set of data statistics include one or more of a version count, image count, or feed item count.

* * * * *